United States Patent
Daniel et al.

(12)
(10) Patent No.: US 6,278,200 B1
(45) Date of Patent: Aug. 21, 2001

(54) CURRENT MANAGEMENT SYSTEM FOR A TELECOMMUNICATIONS POWER SYSTEM

(75) Inventors: Francois Daniel, St-Laurent; Jean-Marc Cyr, Candiac, both of (CA)

(73) Assignee: Astec International Limited, Kowloon (HK)

( * ) Notice: Subject to any disclaimer, the term of this patent is extended or adjusted under 35 U.S.C. 154(b) by 0 days.

(21) Appl. No.: 09/586,316

(22) Filed: Jun. 2, 2000

(51) Int. Cl.$^7$ .................................................. H02J 1/00
(52) U.S. Cl. ................................... 307/31; 307/35
(58) Field of Search ............................ 307/31, 35, 39, 307/32; 363/70

(56) References Cited

U.S. PATENT DOCUMENTS 5,642,100 * 6/1997 Farmer ................................. 340/636

* cited by examiner

Primary Examiner—Shawn Riley
(74) Attorney, Agent, or Firm—Harness, Dickey & Pierce, P.L.C.

(57) ABSTRACT

A current management system for a telecommunications power system includes a power bus, a communications bus, and a distribution module connected to the power bus and the communications bus. A plurality of loads are connected to the distribution module. A plurality of rectifier modules are connected to the power bus, the communications bus and to at least one alternating current source. Each of the rectifier modules includes a neuron that generates a rectifier current signal for the rectifier module. A master controller that is connected to the communications generates an average current signal from the rectifier current signals. The neurons generate a first rectifier control signal that slightly modifies current that is output by the rectifier modules based upon the average current signal and the rectifier current signal. A temperature sensor senses a temperature of each of the rectifier modules. The master controller generates an average temperature signal from the rectifier temperature signals. The neurons generate a second rectifier control signal that slightly modifies the current that is output by the rectifier modules using the average temperature signal and the rectifier temperature signal. In another current management system, the neurons communicate to establish a highest rectifier current. The neurons of each rectifier module adjust their rectifier voltages based on the highest rectifier current to approximate current balancing.

33 Claims, 7 Drawing Sheets

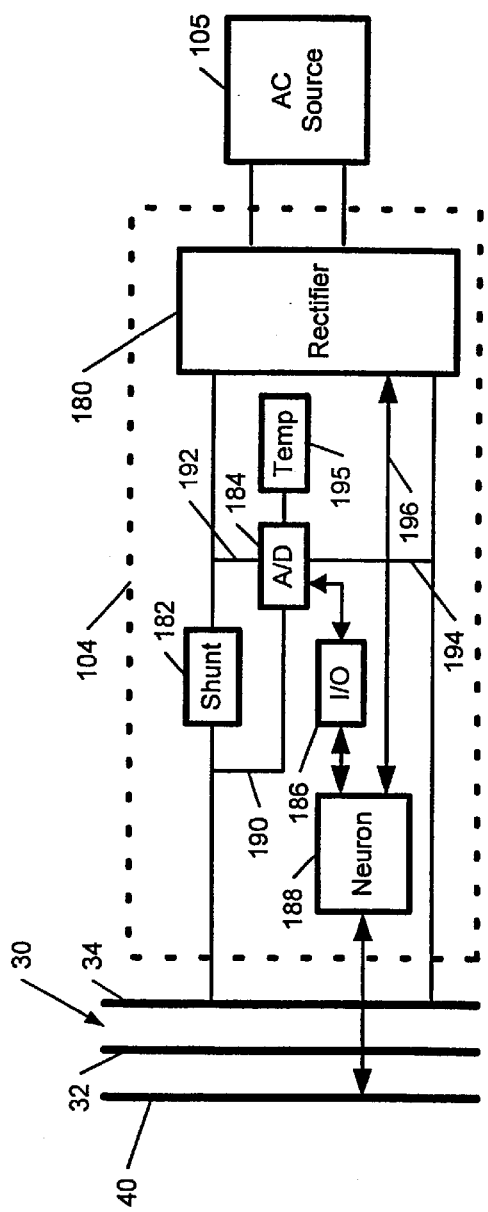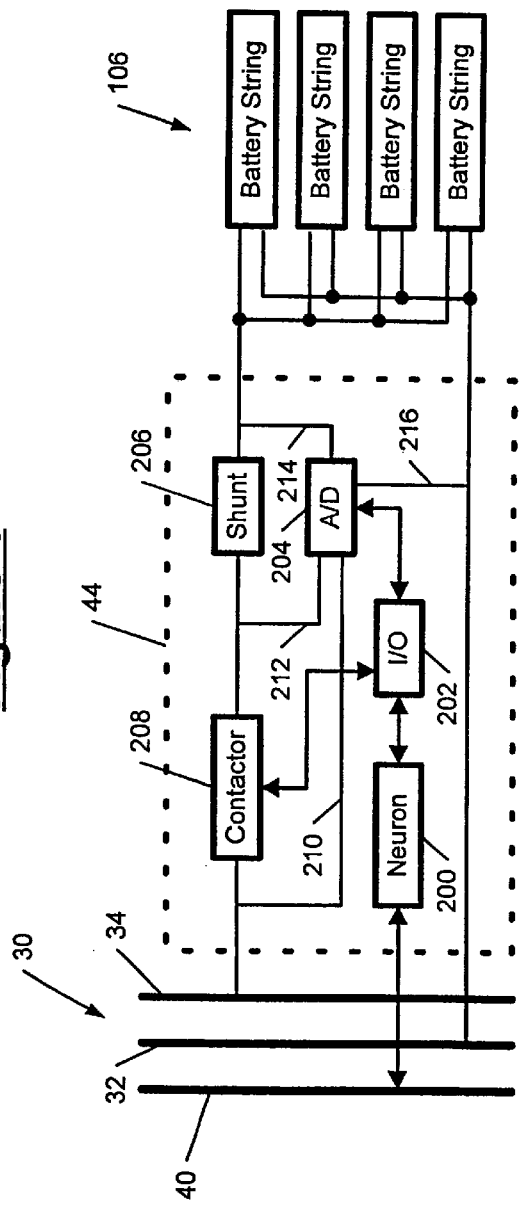
Figure 4
Figure 5

CURRENT MANAGEMENT SYSTEM FOR A TELECOMMUNICATIONS POWER SYSTEM

TECHNICAL FIELD OF THE INVENTION

This invention relates to telecommunications power systems. More particularly, this invention relates to management of current that is output by rectifiers in a telecommunications power system.

BACKGROUND AND SUMMARY OF THE INVENTION

Telecommunications power systems generally employ rectifiers that generate a direct current (DC) voltage from an alternating current (AC) power source. Distribution modules include circuit breakers that connect the rectifiers to loads and that distribute current to the loads. The loads in a telecommunications power system typically include telephone switches, cellular equipment, routers and other associated equipment. In the event that AC power is lost, the telecommunications power systems generally rely on backup batteries and/or generators to provide power and to prevent costly down time. Telephone switches, cellular equipment and routers normally carry thousands of calls and/or data streams that will be interrupted if power is lost causing a significant loss of revenue.

Each of the rectifiers preferably provides a proportional share of the current that is drawn by the loads and a voltage output that is at a float voltage of the backup batteries to prevent battery discharge. Over time, the voltage output of each rectifier may drift due to differences in manufacturing tolerances, temperature variation between rectifiers, line impedance differences, and other factors. As the voltage varies, current output sharing between the rectifiers becomes less than ideal. For example, one rectifier may be operating at full rated current while another may be operating at one half of rated current due to minor operating voltage differences between the rectifiers. If this non-equal sharing continues over time, one or more of the rectifiers in the telecommunications power system may fail prematurely. Most of the time, the load is less than the rectifier's nominal power. Therefore, it is desirable to equalize the load among the rectifiers to prolong their life.

The current management system according to the invention calculates an average rectifier current output and/or an average rectifier temperature to control the voltage output of the rectifiers which, in turn, controls the current output of the rectifiers. By providing fine control of the current output of the rectifiers, current sharing and temperature stress distribution can be accomplished to prolong the life of the rectifiers and to improve voltage and current regulation of the rectifiers.

A current management system for a telecommunications power system according to the invention includes a power bus, a communications bus, and a distribution module connected to the power bus and the communications bus. A plurality of loads are connected to the distribution module. A plurality of rectifier modules are connected to the power bus, the communications bus and an AC source. Each of the rectifier modules includes a neuron that generates a rectifier current signal for the rectifier module. A master controller that is connected to the communications bus generates an average current signal from the rectifier current signals. The neurons change the voltage outputs of the rectifier modules to slightly modify the current that is output by the rectifier modules based upon the average current signal and the rectifier current signal. When the load changes suddenly, the rectifier modules are capable of supplying the load.

In other features of the invention, a temperature sensor senses a temperature of each of the rectifier modules. The master controller generates all average temperature signal from the rectifier temperature signals. The neurons generate a second rectifier control signal that slightly modifies the current that is output by the rectifier modules using the average temperature signal and the rectifier temperature signal.

Still other features will be readily apparent to skilled artisans.

BRIEF DESCRIPTION OF THE DRAWINGS

The various advantages of the present invention will become apparent to those skilled in the art after reading the following specification and by reference to the drawings in which

FIG. 4 is a functional block diagram of the rectifier module of FIG. 1 in further detail;

FIG. 5 is a functional block diagram of the battery connection module of FIG. 1 in further detail;

DETAILED DESCRIPTION OF THE PREFERRED EMBODIMENTS

The preferred embodiments herein described are not intended to be exhaustive or to limit the invention to the precise form disclosed. This description is limited to the preferred embodiment only and is intended to describe the invention to enable one of ordinary skill in the art to practice the invention.

Figure 1:
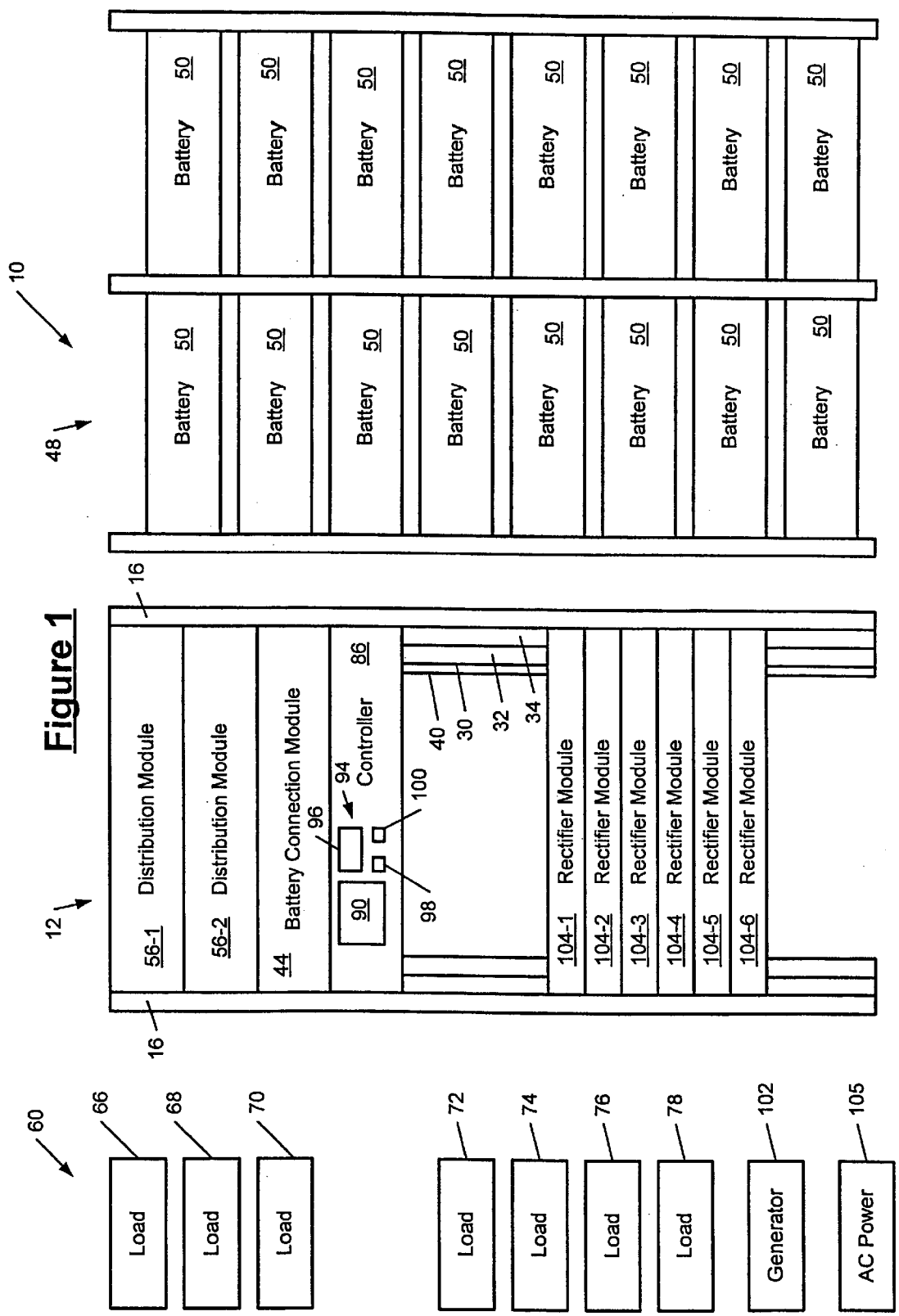
FIG. 1 is a block diagram of a telecommunications power system according to the invention that includes a frame that is connected to a plurality of loads and a battery pallet with a plurality of batteries.

Referring now to FIG. 1, a telecommunications power system 10 is illustrated and includes one or more frames 12 that include a rack 16. A direct current (DC) bus 30 includes first and second conductors 32 and 34 that extend along the rack 16 in a vertical direction and that are separated by an insulating layer (not shown). A communications bus 40 is located adjacent to the DC bus 30 and likewise includes a layer (not shown) that insulates the communications bus 40 from the first and second conductors 32 and 34.

The design of the telecommunications power system 10 is modular such that the capacity of the telecommunications power system 10 can be changed by adding or removing modules from the telecommunications power system 10. The design of the telecommunications power system 10 has been optimized through the use of modular connectors (not shown) to facilitate the connection and disconnection of the modules from the frame 12.

The telecommunications power system 10 includes one or more battery connection modules 44 that are connected to the DC bus 30 and the communication bus 40. The battery connection module 44 is connected to a pallet of backup batteries 48 that includes a plurality of battery cells 50. In a preferred embodiment, each of the battery cells provides a two-volt output and a relatively high current output The battery cells 50 are typically connected into battery strings (identified at 106 in FIG. 2) that contain from 24 to 26 battery cells. Each battery string provides 48 VDC for telephone switch and router applications. Depending upon the length of time desired for the battery backup and the size of the load to be supplied, the number and/or size of the backup batteries may be varied. Skilled artisans can appreciate that other voltages, string sizes and packaging arrangements can be employed for telecommunications power systems having other voltage and current requirements.

One or more distribution modules 56 are connected to the DC bus 30 and the communication bus 40. The distribution modules 56 distribute power to one or more loads 60 such as telecommunications switches, cellular equipment and routers. For example in FIG. 1, the distribution module 56-1 delivers power to loads 66, 68 and 70. The distribution module 56-2 delivers power to loads 72, 74, 76, and 78. The number of distribution modules 56 depends on the size and number of the loads that are associated with the telecommunications power system 10. Connections between the loads and the backup batteries have been omitted for purposes of clarity.

A master controller 86 is connected to the DC power bus 30 and to the communications bus 40. The master controller 86 includes a display 90 and an input device 94 that preferably includes a touch pad 96 and buttons 98 and 100. An alternate display can be a computer monitor. The input device 94 and the display 90 can be combined in a touch screen display. A keyboard and/or mouse may also be employed. The master controller 86 provides an internet browser-like interface that is navigated using the touch pad 96 in a conventional point-and-click manner or using the touch pad 96 and the buttons 98 and 100. Alternately, text-based and/or menu-driven interfaces may be provided.

Figure 2:
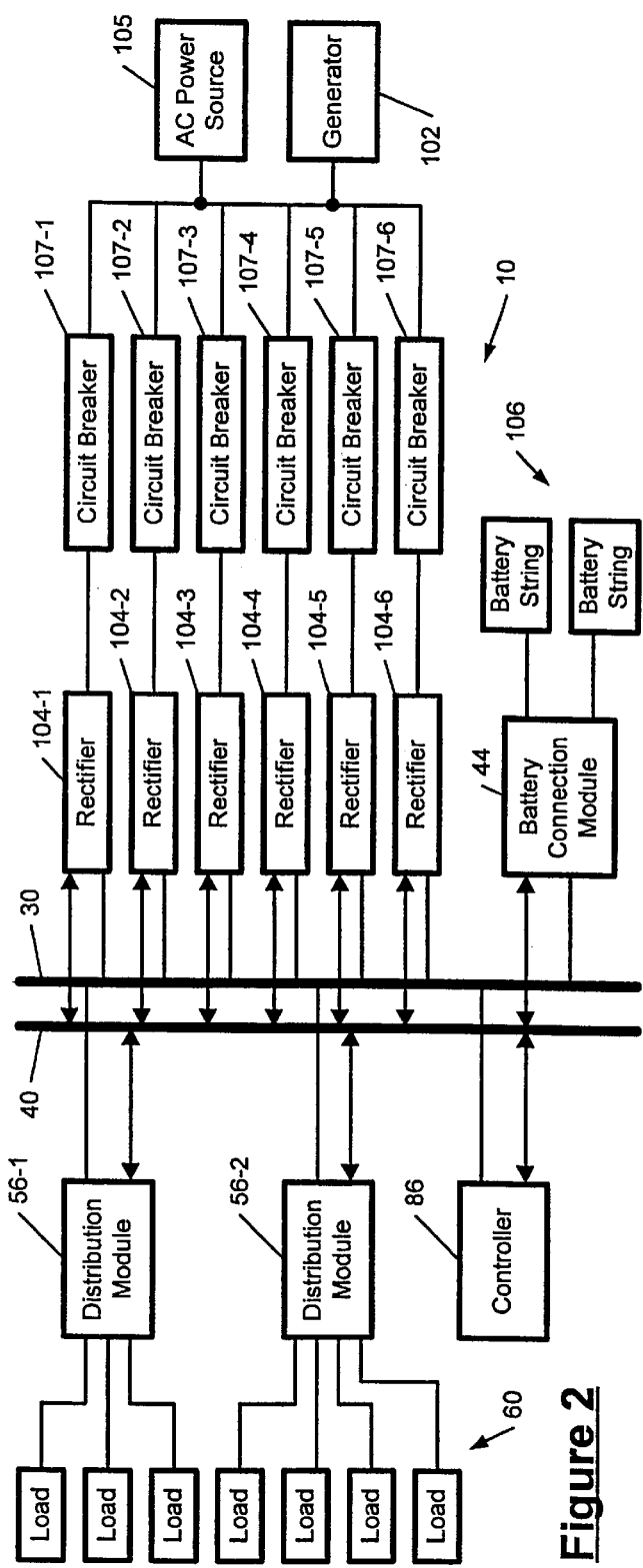
FIG. 2 is a functional block diagram of the telecommunications power system of FIG. 1.

Referring now to FIG. 2, the telecommunications power system 10 further includes a backup generator 102 that provides backup AC power and one or more rectifier modules 104 that are connected to the DC bus 30 and the communications bus 40. A power source 105 provides AC power and is connected by circuit breakers 107 to the rectifier modules 104. In use, the AC power source 105 provides voltage that is typically between 80 and 300 VAC at a frequency between 45 and 65 Hz. The rectifier modules 104 rectify the AC voltage provided by the AC power source 105. The rectifier modules 104 provide a controllable output voltage and current and are rated at 48 volts nominal and 50 or 200 amps. Skilled artisans can appreciate that other voltages and currents may be provided for telecommunications power systems requiring other voltage and current levels.

Depending upon the type of backup batteries employed, the output voltage of the rectifier modules 104 will be set higher than 48 volts. Typically, the rectifier modules 104 operate at a float voltage of the backup batteries during normal operation so that the backup batteries do not discharge current. The float voltage is typically between 52 and 54 VDC depending upon the backup battery characteristics.

The rectifier modules 104 preferably include a shunt and an analog to digital (A/D) converter for sensing rectifier voltage and current. The rectifier module 104 transmits digital signals representing the rectifier voltage and current (in addition to other digital control and communications signals) to the controller 86 via the communications bus 40. Preferably, the controller 86 employs a serial communications protocol that is insensitive to noise. In a highly preferred embodiment, the communications system employs serial communications using a CAN protocol such as CAN version 2.0B.

The distribution modules 56 include one or more circuit breakers (not shown) which are preferably modular, plug-in type circuit breakers to facilitate connection and disconnection of the loads 60. The distribution module 56 connects the loads 60 to the power bus 30.

Figure 3:
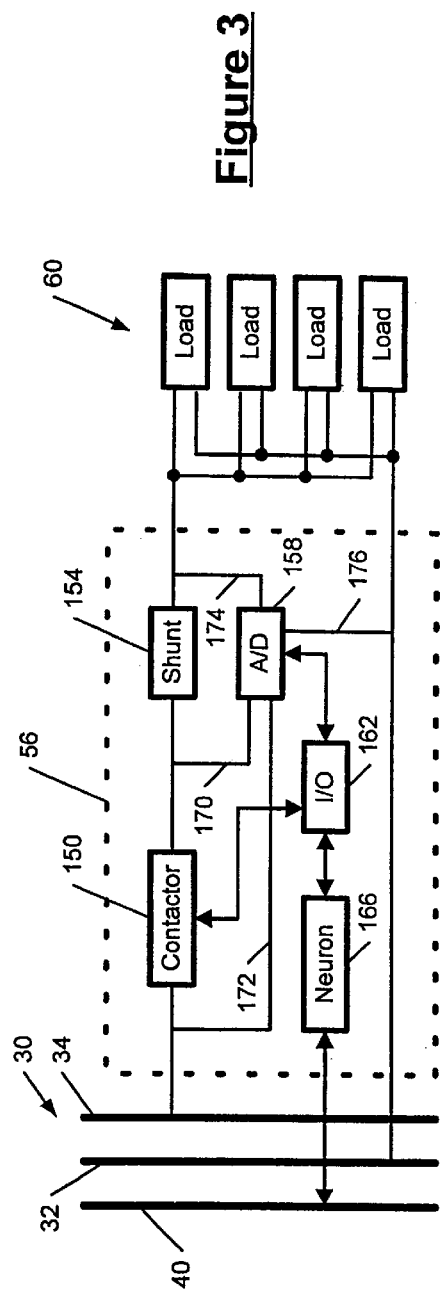
FIG. 3 is a functional block diagram of the distribution module of FIG. 1 in further detail.

Referring now to FIG. 3, the distribution module 56 is illustrated in further detail. The distribution module 56 includes one or more circuit breakers (not shown) that are located between the loads 60 and the DC bus 30. The distribution module 56 includes a contactor 150, a shunt 154, an A/D converter 158, an input/output (I1O) interface 162, and a neuron 166. The contactor 150 is controlled by the neuron 166 through the I/O interface 162. Because contactors are a single point of failure, some system operators opt for battery disconnection instead of load disconnection. When the contactor 150 falls, power to the loads is interrupted. When battery disconnection is used, the load is not interrupted when a contactor (as shown in FIG. 5) fails. Both types of disconnection may be employed if desired.

The neuron 166 is preferably a controller that includes a processor and memory (not shown). The neuron 166 performs local processing for the distribution module 56 and I/O communications between the distribution module 56, the master controller 86, and other modules in the telecommunications power system 10. The I/O module 162 is connected to the neuron 166 and to the A/D converter 158. The A/D converter 158 includes sensing leads 170 and 172 that sense a voltage across the contactor 150. The sensing lead 170 and sensing lead 174 sense a voltage across the shunt 154.

Referring now to FIG. 4, the rectifier modules 104 are illustrated in further detail and include a rectifier 180, a shunt 182, an AID converter 184, an I/O interface 186, and a neuron 188. The neuron 188 performs local processing functions for the rectifier module 104 and controls I/O communications between the rectifier module 104, the master controller 86 and other modules in the telecommunications power system 10. The AID converter 184 includes sensing leads 190, 192, and 194. The A/D converter 184 senses a rectifier voltage output using the sensing leads 192 and 194 and a rectifier current output by sensing voltage across the shunt 182 using leads 190 and 192. A temperature sensor 195 outputs a voltage signal to the A/D converter 184 that is proportional to the temperature of the rectifier 180. The neuron 188 generates a rectifier control signal that is output via connection 196 to the rectifier 180. The rectifier control signal slightly adjusts the rectifier voltage to vary the rectifier current based on the average temperature and/or the average current of the rectifier modules 104 to provide current sharing and temperature stress distribution as will be described further below. While the temperature sensor 195 is illustrated as a separate device, the temperature sensor can be integrated with the rectifier 180.

Referring now to FIG. 5, the battery connection module 44 is illustrated and includes a neuron 200, an I/O interface 202, an A/D converter 204, a shunt 206 and a contactor 208. The neuron 200 performs local processing functions and I/O communications between the battery connection module 44, the master controller 86 and other modules in the telecommunications power system 10. The contactor 208 is controlled by the neuron 200 through the I/O interface 202. The A/D converter 204 includes sensing leads 210, 212, 214, and 216. The A/D converter 204 senses a battery voltage using the leads 214 and 216. The A/D converter 204 senses battery current by sensing a voltage across the shunt 206 using the leads 212 and 214. The A/D converter 204 senses a voltage across the contactor 208 using the leads 210 and 212.

Figure 6:
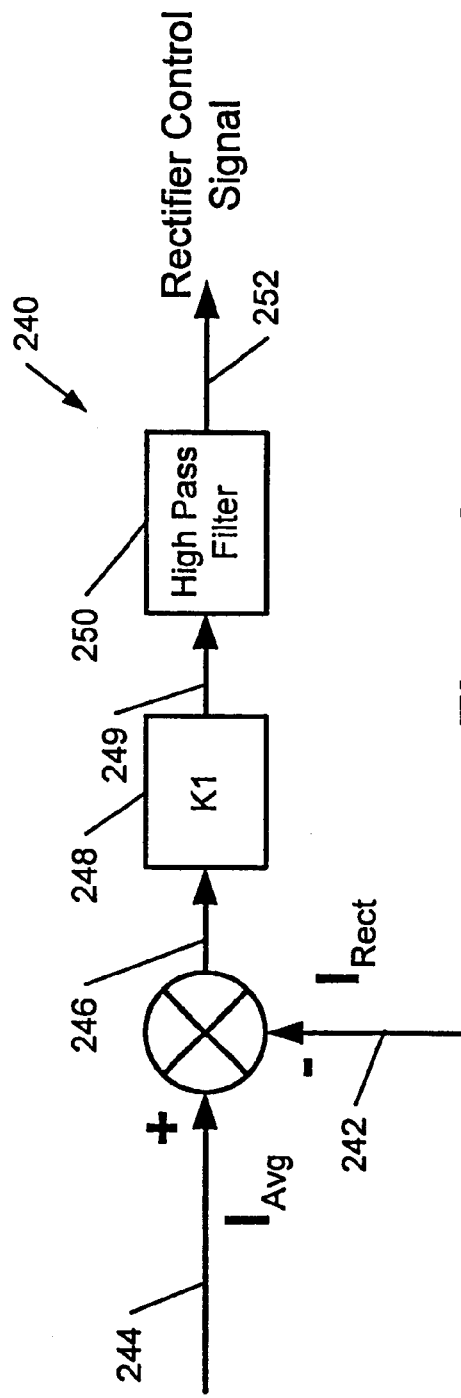
FIG. 6 is a dataflow diagram illustrating control of the rectifier current output of the rectifier modules using an average current feedback loop.

Referring now to FIG. 6, a first current management system according to the invention manages the current output of the rectifier modules 104 based on the average current of the rectifier modules 104. The neuron 188 of each of the rectifier modules 104 executes a first current management procedure that is identified at 240. The neurons 188 transmit current output signals 242 for each of the rectifier modules 104 to the master controller 86. The master controller 86 preferably triggers all of the neurons 188 to measure the current output of the rectifier modules at the same time and to transmit current output signals to the master controller 86. Alternately, the neurons 188 can transmit the current output signals 242 based upon a timer (preferably in a synchronized manner). The master controller 86 computes an average current signal 244 and transmits the average current signal 244 to the neurons 188. For stability purposes, the neurons preferably measure the current (and temperature below) at the same time to prevent oscillation.

The neuron 188 compares the current output signal 242 of the rectifier module 104 that is associated with the neuron 188 and that was previously sent to the master controller 86 with the average current signal 244. The neuron 188 generates a first difference signal 246 by taking a difference between the average current output 244 and the current output signal 242 of the rectifier module 104 that is associated with the neuron 188. The neuron 188 multiplies the first difference signal 246 by a gain factor K1 at 248 and filters a gain result signal 249 at 250 (using conventional control processing techniques) to generate a rectifier control signal 252. The neuron 188 transmits the rectifier control signal 252 to the rectifier 180 to slightly alter the voltage output of the rectifier module 104 which, in turn, alters the current output of the rectifier module 104. Preferably a proportional regulator is used. Average current control using a proportional regulator allows sharing to be maintained (with slight degradation) even when a rectifier module fails. A proportional-integral or proportional-integral-differential regulator may also be used.

When the current output signal 242 of the rectifier module 104 exceeds the average current signal 244, the first difference signal 246 is a negative control signal which slightly reduces the voltage and current output of the rectifier module 104. When the current output signal 242 of the rectifier module 104 is less than the average current signal 244, the first difference signal 246 is a positive control signal which will increase the voltage and current output of the rectifier module 104.

Figure 7:
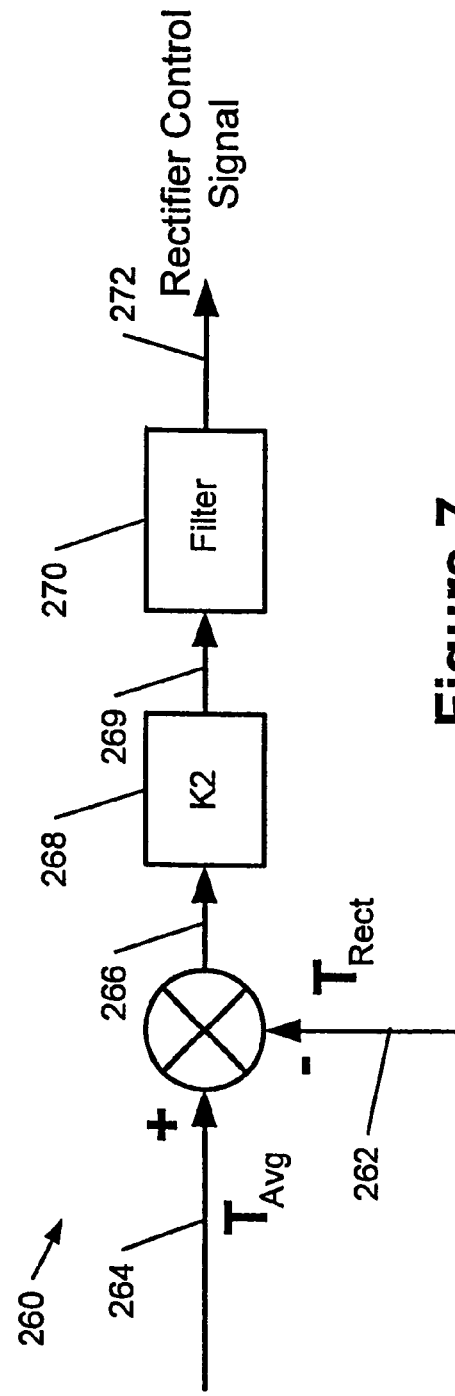
FIG. 7 is a dataflow diagram illustrating control of the rectifier current output of the rectifier modules using an average temperature feedback loop.

Referring now to FIG. 7, a second current management system manages the current output of the rectifier modules 104 based on the average temperature of the rectifier modules 104. The neuron 188 of each rectifier module 104 executes a second current management procedure that is identified at 260. The second current management procedure slightly alters the voltage output of the rectifier module 104 which, in turn, slightly alters the current output of the rectifier module 104 based on a temperature of the rectifier module in relation to an average temperature of all of the rectifier modules 104.

For example, the neuron 188 transmits a temperature signal 262 for the rectifier module 104 to the master controller 86. The master controller 86 preferably triggers the neuron 188 to measure the ambient temperature of the rectifier at the same time and to transmit the result to the master controller 86.. Alternately, the neuron 188 can transmit the temperature signals based upon a timer. The master controller 86 computes an average temperature for all of the rectifier modules 104 and transmits an average temperature signal 264 to the neuron 188. The neuron 188 compares the average temperature signal 264 with the temperature signal 262 of the rectifier module 104 and generates a second difference signal 266 which is multiplied by a gain factor K2 at 268. The neuron 188 filters a gain result signal 269 at 270 in accordance with conventional control processing techniques and outputs a rectifier control signal 272 to the rectifier 180 to slightly alter the voltage outputs of the rectifier modules which, in turn, slightly alters the current outputs of the rectifier modules 104.

For example, when the temperature of one of the rectifier modules 104 is greater than the average temperature, the rectifier module 104 experiences higher stress which may reduce the life of the rectifier module 104. To better distribute the stress, the second current management procedure 260 generates a negative difference signal that slightly reduces the voltage of the rectifier module 104 which slightly reduces the current of the rectifier module 104. Since the temperature of the rectifier module 104 is related to the current output by the rectifier module 104, the temperature of the rectifier module 104 gradually decreases.

Figure 8:
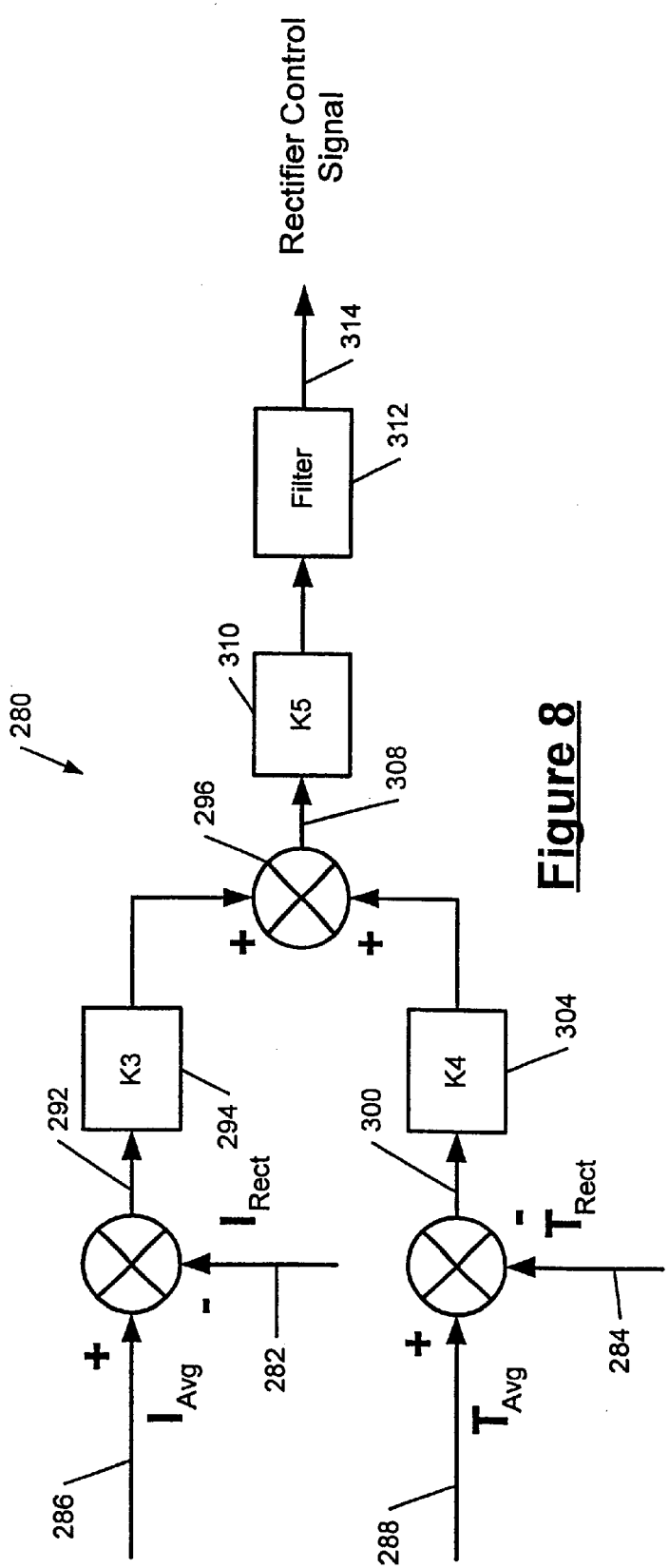
FIG. 8 is a control diagram illustrating control of the rectifier current output of the rectifier modules using a combined average current and average temperature feedback loop.

Referring to FIG. 8, the first and second current management procedures of FIGS. 6 and 7 are combined into a third current management procedure that is identified at 280. The third current management procedure 280 controls the current of the rectifier module 104 based upon the average temperature and the average current of the rectifier modules 104. For stability reasons, the temperature-based, closed-loop control is preferably approximately ten times slower than the current-based, closed-loop control. The neuron 188 generates and transmits a rectifier current signal 282 for the rectifier module 104 to the master controller 86. The neuron 188 likewise generates and transmits a rectifier temperature signal 284 for the rectifier module 104 to the master controller 86. The master controller 86 preferably triggers all of the neuron 188 to send the temperature and current signals at the same time. Alternately, the neuron 188 can transmit the temperature signals based upon a timer.

The master controller 86 generates and transmits an average current signal 286 and an average temperature signal 288 to the neurons 188 of the rectifier modules 104. The neuron 188 compares the average current signal 286 to the rectifier current signal 282 and generates a third difference signal 292 that is multiplied by a third gain factor K3 at 294 and output to a summing circuit at 296.

The neuron 188 compares the average temperature signal 288 to the rectifier temperature signal 284 and generates a fourth difference signal 300 that is multiplied by a fourth gain factor K4 at 304 and output to the summing circuit 296. An output 308 of the summing circuit 296 is multiplied by a fifth gain factor K5 at 310 and filtered at 312 using conventional control processing techniques. The neurons 188 output a rectifier control signal 314 to the rectifiers 180 that slightly modifies the voltage output of the rectifier module 104 which, in turn, slightly modifies the rectifier current output.

Current control based on average current and/or average temperature according to the invention manages current through the use of a current-based feedback loop, a temperature-based feedback loop, or a combined current-based and temperature-based feedback loop. By monitoring current and/or temperature, the current management system according to the invention approximately equally distributes the current load and temperature stress in the telecommunications power system 10.

If communications between the neurons 188 and the master controller 86 are lost, the master controller 86 stops sending the average current and/or average temperature signals. The current management procedure no longer provides the rectifier control signal based on the average current and/or average temperature. In this situation, the telecommunications power system 10 reverts back to control based on conventional slope share techniques that are performed locally by the neuron 188.

When current management is based on slope share techniques, the rectifier modules 104 operate as if a low value resistor has been placed in series with the output of the rectifier 180. If the rectifier voltage slightly increases, the voltage drop across the low value resistor slightly increases and the increase in current output is automatically limited. While adversely impacting voltage regulation, the slope share technique provides an approximated current sharing method that is generally acceptable until communications with the master controller 86 are restored.

When the CAN protocol is employed, the master controller 86 requests the output current of each rectifier module 104. The current control loop will occupy a small portion of the total real time bandwidth and the processing power of the master controller 86 and the neurons 188. Accordingly, the current management procedure requires a relatively low percentage of the resources of the telecommunications power system 10.

Preferably, average current sharing is selected over techniques employing maximum or minimum current sharing because average current sharing offers superior performance in the event of a rectifier failure. Skilled artisans can appreciate that the teaching of the present invention can be applied using maximum and minimum current sharing techniques. While the present invention discloses varying the voltage output of the rectifier modules to control the current output of the rectifier modules, skilled artisans can appreciate that the rectifier current can be controlled directly. However, controlling the current output by varying the voltage output offers superior performance when the load experiences a suddenly changes.

Figure 9:
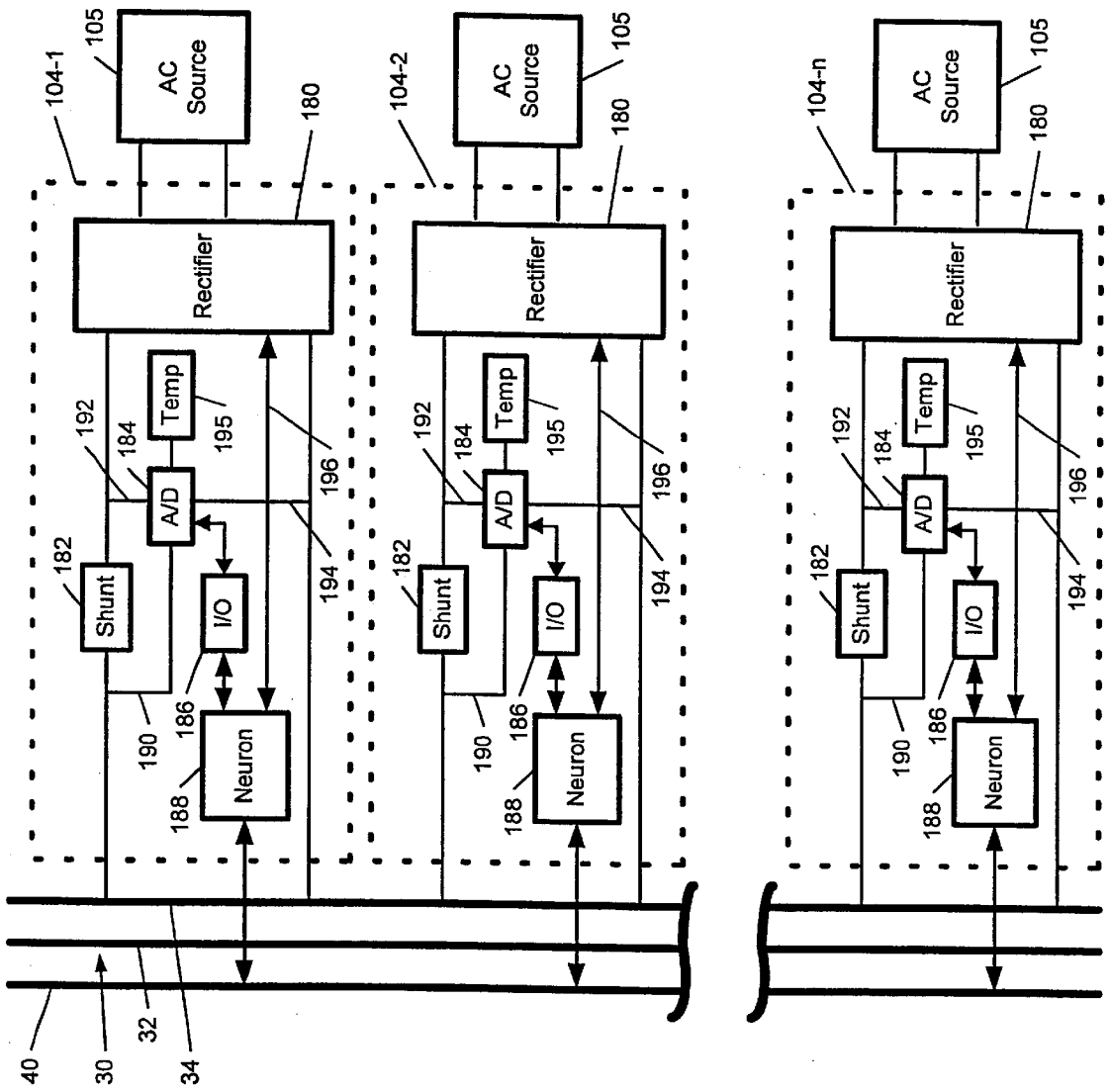
FIG. 9 is a functional block diagram illustrating communications between the neurons of multiple rectifier modules for an alternate current management system according to the invention.

Referring now to FIG. 9, an alternate current management procedure that operates independently from the master controller 86 is illustrated. In the alternate current management procedure, the neurons 188 of the rectifier modules 104 communicate with each other to establish the highest current output for the rectifier modules 104. Each of the neurons 188 stores the highest current signal. Then, each neuron 188 compares the output current of the rectifier module that is associated with the neuron 188 to a predetermined percentage of the highest current signal using a regulator. Preferably the regulator is implemented in software of the neuron 188. Alternately, the regulator can be provided as a separate device. The regulator can be a proportional (P) regulator, a proportional-integral (PI) regulator or a proportional-integral-differential (PID) regulator. A rectifier control signal that is output by the regulator is input to the rectifier module 104 to alter the voltage output of the rectifier module 104 which, in turn, alters the current output of the rectifier module 104. While a preferred embodiment employs current sharing based on a maximum current, skilled artisans can appreciate that current sharing can be implemented based on a minimum current or an average current without departing from the spirit of the invention.

Figure 10:
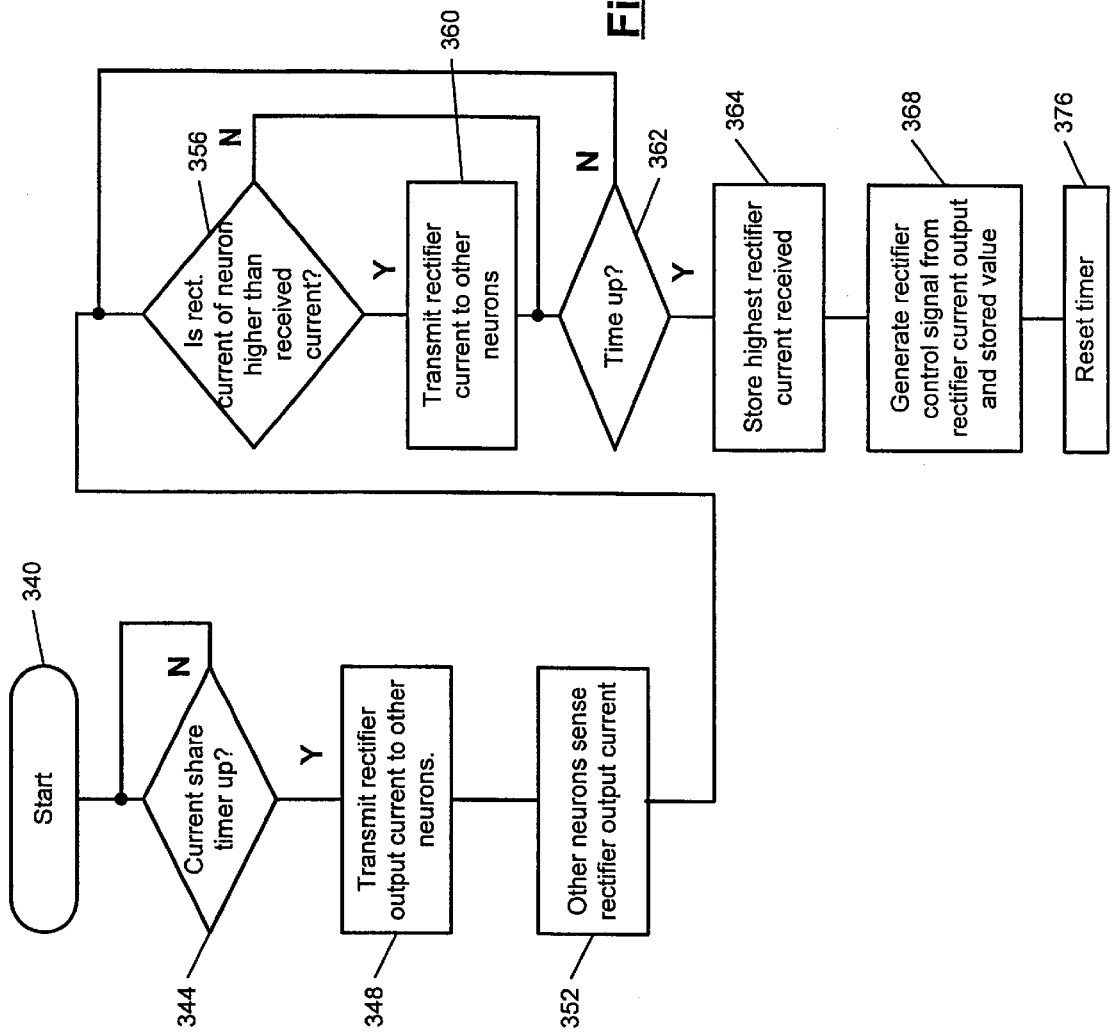
FIG. 10 is a flowchart illustrating steps for executing the alternate current management system of FIG. 9.

Referring now to FIG. 10, a flowchart illustrating steps for executing the alternate current management procedure is shown. Control begins at step 340. control continues with step 344 where all of the neurons 188 determine whether a current share timer that is associated with the neurons 188 has timed out. If not, control loops to step 344. Otherwise when a current share timer of a first neuron times out, control continues with step 348 where the first neuron 188 transmits the current output of its rectifier module 104 to the remaining neurons 188. A second neuron 188 senses the current output of its rectifier modules 104 at step 352. At step 356, the second neuron 188 determines whether the rectifier current received from the first neuron 188 is greater that the current output of rectifier modules 104 of the second neuron 188. If not, then the second neuron 188 transmits the higher rectifier current to the all of the other neurons 188. If the rectifier current received from the first neuron is higher than the rectifier current of the second neuron, the second neuron does not transmit the current output of the rectifier module 104. The steps 352, 356 and 360 are repeated for additional neurons other than the first and second neurons.

For example, a telecommunications power system includes four rectifier modules: a first rectifier module with a 9 Amp (A) rectifier current, a second rectifier module with a 15 A rectifier current, a third rectifier with a 17 A current and a fourth rectifier with an 8 A rectifier current. The first rectifier module's current share timer times out first and the first rectifier module transmits its rectifier current to the second, third and fourth rectifier modules. The second rectifier module transmits its rectifier current to the first, third and fourth rectifier modules since the rectifier current of the second rectifier module is higher than the rectifier current of the first rectifier module. The third rectifier module transmits its rectifier current to the first, second and fourth rectifier modules because the rectifier current of the third rectifier module is higher than the rectifier current of the first rectifier module. The fourth rectifier module does not transmit its rectifier current since it is not higher than the rectifier current of the first module. The third rectifier module transmits its rectifier current to the first, second and fourth rectifier modules because the rectifier current of the third rectifier module is higher than the rectifier current of the second rectifier module. The second rectifier module does not transmit its rectifier current since it is not higher than the rectifier current of the third module.

Since a serial communications protocol is used, the transmission of the rectifier currents cannot occur simultaneously (for example when the second and third rectifier modules transmit their rectifier currents in the example above). In an alternate mode, the third rectifier module can delay sending its rectifier current when a new rectifier current is received (i.e. from the second rectifier module). In this mode, the third rectifier module would send its rectifier current only if it is greater than the rectifier current of the second rectifier module (or the latest received rectifier current).

When the telecommunications power system contains additional neurons, a few more iterations may be needed. To ensure that all of the iterations are complete and the highest rectifier current signal is stored, control loops until a predetermined time (sufficient for the maximum number of rectifier modules) is up as determined in step 362. Then control stores the highest rectifier current at step 364. At step 368, control generates a rectifier control signal (using the regulator described above) based on the current output of the rectifier module 104 and the highest stored rectifier current. At step 376, the current share timer is reset and control returns to step 340.

Preferably, the current share timer that is associated with the neuron 188 is reset each time that the neuron 188 receives a maximum current from another neuron. In addition, while current sharing is based on maximum current, current sharing can be based on minimum current and/or average current. Preferably, the neurons measure their current at approximately the same time to promote stability.

As can be appreciated, the alternate current management procedure runs without the assistance of the master controller 86 that allows the master controller 86 to perform other tasks. The loading of the communications bus is approximately the same as that described above with respect to current management based on average rectifier module current.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, the specification and the following claims.

What is claimed is:

1. A current management system for a telecommunications power system, comprising:

a power bus;

a communications bus;

a distribution module connected to said power bus and said communications bus;

a plurality of loads connected to said distribution module;

a plurality of rectifier modules connected to said power bus, said communications bus and to at least one alternating current source, wherein each of said rectifier modules includes a neuron that generates a rectifier current signal for said rectifier module;

a master controller connected to said communications bus that generates an average current signal from said rectifier current signals, wherein said neurons generate a first rectifier control signal that slightly modifies current that is output by said rectifier modules based upon said average current signal and said rectifier current signal.

2. The current management system of claim 1 wherein said neurons generate said first rectifier control signal by taking a difference between said average current signal and said rectifier current signal.

3. The current management system of claim 2 wherein said neurons multiply said first rectifier control signal by a first gain factor.

4. The current management system of claim 3 wherein said neurons filter said first rectifier control signals.

5. The current management system of claim 3 wherein each of said rectifier modules further includes:

a temperature sensor for sensing a temperature of said rectifier module and for generating a rectifier temperature signal.

6. The current management system of claim 5 wherein said master controller generates an average temperature signal from said rectifier temperature signals.

7. The current management system of claim 6 wherein said neurons generate second rectifier control signals that modify said current that is output by said rectifier modules using said average temperature signal and said rectifier temperature signals.

8. The current management system of claim 7 wherein said neurons modify said second rectifier control signals by taking a difference between said average temperature signal and said rectifier temperature signal.

9. The current management system of claim 8 wherein said neurons multiply said second rectifier control signals by a second gain factor.

10. The current management system of claim 9 wherein said neurons combine said first and second rectifier control signals into third rectifier control signals.

11. The current management system of claim 10 wherein said neurons add said first and second rectifier control signals.

12. The current management system of claim 10 wherein said neurons multiply said third rectifier control signals by a third gain factor.

13. A current management system for a telecommunications power system, comprising:

a power bus;

a communications bus;

a distribution module connected to said power bus and said communications bus;

a plurality of loads connected to said distribution module;

a plurality of rectifier modules connected to said power bus, said communications bus and to at least one alternating current source, wherein each of said rectifier modules includes a neuron that generates a rectifier temperature signal;

a master controller connected to said communications bus that generates an average temperature signal from said rectifier temperature signals, wherein said neurons generate rectifier control signals that modify current that is output by said rectifier modules based upon said average temperature signal and said rectifier temperature signals.

14. The current management system of claim 13 wherein said neurons generate said rectifier control signals by taking a difference between said average temperature signal and said rectifier temperature signals.

15. The current management system of claim 14 wherein said neurons multiply said rectifier control signals by a second gain factor and filter said rectifier control signals.

16. A method of managing current in a telecommunications power system that includes a power bus, a communications bus, a distribution module connected to said power bus, a plurality of loads connected to said distribution module, a plurality of rectifier modules connected to said power bus and including neurons, said communications bus and to at least one alternating current source, and a master controller connected to said communications bus, said method comprising the steps of:

generating rectifier current signals based on current output by said rectifier modules;

generating an average current signal based on said rectifier current signals; and generating first rectifier control signals at said rectifier modules that modify current output by said rectifier modules based upon said average current signal and said rectifier current signals.

17. The method of claim 16 further comprising the step of:

generating said first rectifier control signals by taking a difference between said average current signal and said rectifier current signals.

18. The method of claim 17 further comprising the step of:

multiplying said first rectifier control signals by a first gain factor.

19. The method of claim 16 wherein said master controller generates said average current signal and said neurons generate said rectifier current signals.

20. The method of claim 18 further comprising the step of:

sensing a temperature of said rectifier modules; and generating rectifier temperature signals based on said temperature.

21. The method of claim 20 further comprising the step of:

generating an average temperature signal from said rectifier temperature signals.

22. The method of claim 21 further comprising the step of:

generating second rectifier control signals that modify current that is output by said rectifier modules using said average temperature signal and said rectifier temperature signals.

23. The method of claim 22 further comprising the step of:

generating said second rectifier control signals by taking a difference between said average temperature signal and said rectifier temperature signals.

24. The method of claim 23 further comprising the step of:

multiplying said second rectifier control signals by a second gain factor.

25. The method of claim 24 further comprising the step of:

combining said first and second rectifier control signals into third rectifier control signals.

26. The method of claim 25 further comprising the step of:

adding said first and second rectifier control signals.

27. The method of claim 25 further comprising the step of:

multiplying said third rectifier control signals by a third gain factor.

28. A method of managing current in a telecommunications power system that includes a power bus, a communications bus, a distribution module connected to said power bus, a plurality of loads connected to said distribution module, a plurality of rectifier modules connected to said power bus and including neurons and a temperature sensor, said communications bus and to at least one alternating current source, and a master controller connected to said communications bus, said method comprising the steps of:

generating rectifier temperature signals based on a temperature of said rectifier modules using said temperature sensors;

generating an average temperature signal based on said rectifier temperature signals; and generating first rectifier control signals at said rectifier modules that slightly modify current output by said rectifier modules based upon said average temperature signal and said rectifier temperature signals.

29. The method of claim 28 further comprising the step of:

generating said rectifier control signals by taking a difference between said average temperature signal and said rectifier temperature signals.

30. The method of claim 28 further comprising the step of:

multiplying said rectifier control signals by a second gain factor; and filtering said rectifier control signals.

31. A method of managing current in a telecommunications power system that includes a power bus, a communications bus, a distribution module connected to said power bus, a plurality of loads connected to said distribution module, a plurality of rectifier modules connected to said power bus and including neurons, said communications bus and to at least one alternating current source, and a master controller connected to said communications bus, said method comprising the steps of:

generating and transmitting a first rectifier current signal based on current output by said rectifier modules using a first neuron;

receiving said first rectifier current signal from said first neuron at others neurons;

comparing said first rectifier current signal from said first neuron to a plurality of rectifier current signals for said other neurons;

generating a second rectifier current signal using said other neuron if said first rectifier current signal is less that said rectifier current signal of other neuron;

repeating said comparing and said generating steps until a highest rectifier current is identified; and storing said highest rectifier current in said neurons.

32. The method of claim 31 further comprising the steps of:

comparing said rectifier current signal of said neurons to said highest rectifier current; and generating a rectifier control signal that slightly alters said rectifier current.

33. The method of claim 32 wherein said second comparing step involves using at least one of a proportional regulator, a proportional-integral regulator, and a proportional-integral-differential regulator.

* * * * *

UNITED STATES PATENT AND TRADEMARK OFFICE
CERTIFICATE OF CORRECTION

PATENT NO.   : 6,278,200 B1
DATED        : August 21, 2001
INVENTOR(S)  : Francois Daniel et al.

Page 1 of 1

It is certified that error appears in the above-identified patent and that said Letters Patent is hereby corrected as shown below:

<u>Title page,</u>
ABSTRACT, line 10, before "generates" insert -- bus --

<u>Column 2,</u>
Line 3, "all" should be -- an --

<u>Column 3,</u>
Line 13, after "output" insert -- . --

<u>Column 4,</u>
Line 27, "(11O)" should be -- (I/O) --
Line 32, "falls" should be -- fails --
Lines 49 and 54, "AID" should be -- A/D --

<u>Column 7,</u>
Line 58, "a suddenly changes" should be -- sudden changes --

<u>Column 8,</u>
Line 17, "control" should be -- Control --
Line 30, delete "the" (first occurrence in the patent and application)

<u>Column 12,</u>
Line 34, "others" should be -- other --
Line 41, "that" should be -- than --

Signed and Sealed this

Twenty-third Day of April, 2002

*Attest:*

JAMES E. ROGAN
*Attesting Officer*   *Director of the United States Patent and Trademark Office*